United States Patent [19]

Baker et al.

[11] 4,189,631

[45] Feb. 19, 1980

[54] HAMBURGER BUN STORAGE DEVICE

[75] Inventors: Edward D. Baker, San Francisco; Nils Lang-Ree, Los Altos, both of Calif.

[73] Assignee: NPI Corporation, Burlingame, Calif.

[21] Appl. No.: 913,651

[22] Filed: Jun. 8, 1978

[51] Int. Cl.² ............................................. H05B 3/00
[52] U.S. Cl. ................................. 219/388; 219/385; 219/390; 219/404; 219/411; 219/472; 99/386; 99/390
[58] Field of Search .................. 99/385, 386, 387, 390, 99/420, 404; 219/388, 388 C, 385, 472, 390, 401, 411, 405

[56] References Cited

U.S. PATENT DOCUMENTS

| 1,536,538 | 5/1925 | Stouffer | 99/386 |
| 1,696,613 | 12/1928 | Shroyer | 99/386 |
| 1,868,287 | 7/1932 | Haeringer | 99/386 |
| 2,274,190 | 2/1942 | Cramer | 219/390 |
| 2,579,827 | 12/1951 | Johnson | 99/386 |
| 3,090,294 | 5/1963 | Rodman | 99/386 |
| 3,334,620 | 8/1967 | Werth | 219/354 |
| 3,335,262 | 8/1967 | Smart et al. | 219/472 |
| 3,604,338 | 9/1971 | Fiedler | 99/386 |
| 3,620,156 | 11/1971 | Schindler et al. | 99/390 |

FOREIGN PATENT DOCUMENTS 984729  3/1965  United Kingdom ................. 219/388 C Primary Examiner—Bruce A. Reynolds
Assistant Examiner—Bernard Roskoski
Attorney, Agent, or Firm—Lothrop & West

[57] ABSTRACT

A hamburger bun storage device has a supporting frame on which a bun-toasting and heating element is disposed. The heating element is preferably a planar member superposed above a parallel planar conveyor mounted on the frame to advance in a predetermined direction. The heating element is movable up and down; i.e. toward and away from the associated conveyor. A drawer enclosure is disposed on the heating element on the side thereof opposite the conveyor and is open only in a direction transverse to the predetermined direction and at the side of the frame. A drawer is slidable in the drawer enclosure between an open position and a closed position in which a drawer end plate is in abutment with the frame.

1 Claim, 2 Drawing Figures

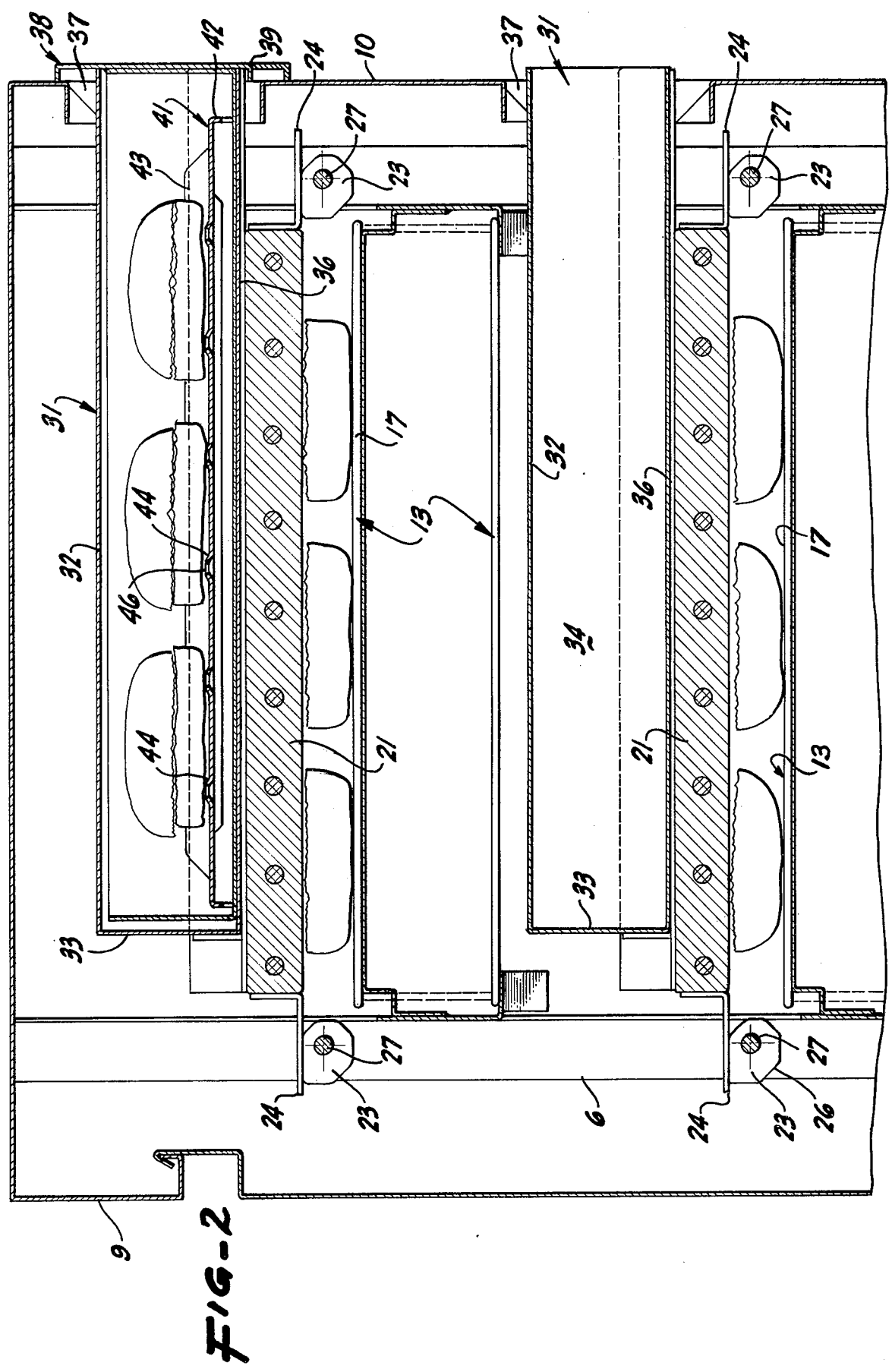

HAMBURGER BUN STORAGE DEVICE

BRIEF SUMMARY OF THE INVENTION

In devices for the preparation of hamburger buns, it is customary to toast the separate bun crowns and bun heels and to do so shortly before they are needed for assembly with a cooked hamburger in order that the resulting product will be relatively fresh and warm. It is often difficult to accomplish this because the buns tend to be made out of sequence with the cooking of the hamburger patties and because the buns tend to lose temperature very rapidly unless they are carefully taken care of. The problem becomes aggravated when a relatively large number of buns are needed in a relatively short time. In the present arrangement, advantage is taken of heat available in the hamburger bun toasting device for providing storage for already toasted buns, whether heels or crowns or both, and to keep such bun portions at an elevated, satisfactory temperature for a protracted period of time, at least long enough to maintain their temperature at a high point when the buns are to be utilized. For doing this, the mechanism is arranged to utilize what normally would be waste heat in the toasting apparatus and to do so without any substantial enlargement in size of the customary toasting device or in its complexity.

BRIEF DESCRIPTION OF THE SEVERAL VIEWS OF THE DRAWINGS

FIG. 2 is a view to an enlarged scale, the view being a cross-section, the plane of which is indicated by the line 2—2 of FIG. 1.

DETAILED DESCRIPTION

Figure 1:
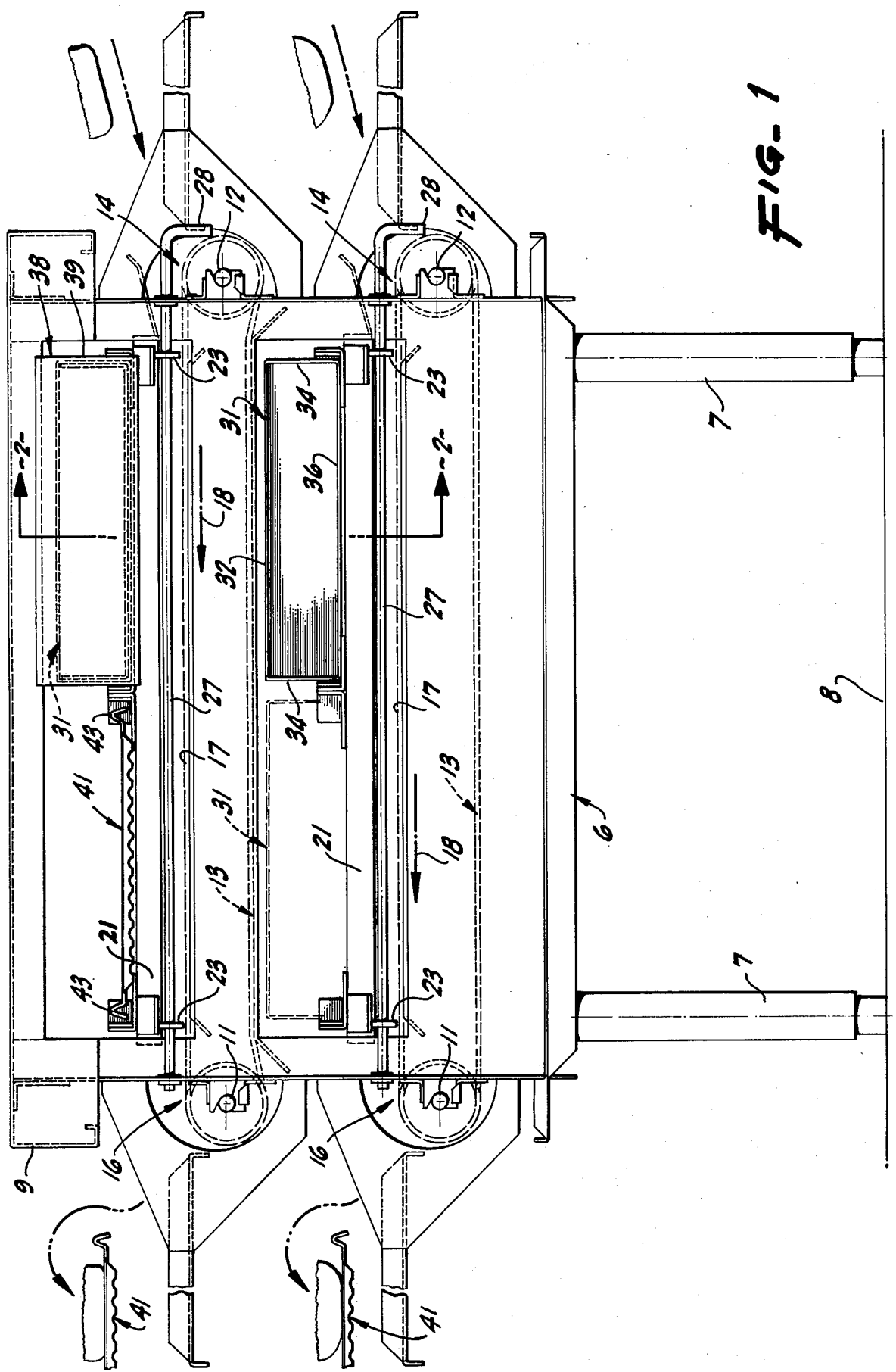
FIG. 1 is a side elevation of a hamburger bun storage device constructed pursuant to the invention and in duplex form, the view being special in that a portion of the near side of the device has been removed to disclose and permit illustration of the interior construction.

While a hamburger bun storage device pursuant to the present invention can be embodied in a large number of different ways and can be embodied singly if desired, it has with some success been embodied as shown herein, in which the mechanism is preferably duplicated to take care of hamburger buns which have been severed into crown portions and heel portions. Although the duplicated mechanisms are substantially identical, they serve well to toast the separate bun portions, and the description herein is intended to apply to both available portions.

In one form of device, there is provided a frame 6 having support legs 7 resting upon a floor 8 in the usual way. The frame is made up of the customary shapes of angle and plate members and preferably is substantially enclosed on all sides, including the top by panels 9 and 10. Disposed on the frame are cross shafts 11 and 12 serving to support a lower conveyor chain 13 extending from a feed opening 14 to a discharge opening 16. The chain is arranged to be driven in a direction so that its upper run 17 advances in the direction of the arrow 18 in FIG. 1, this being a predetermined direction of advance.

Situated on the frame just above the conveyor chain 13 is a planar heating element 21 or platen preferably supplied with electricity and maintained at an elevated, toasting temperature. The element 21 is generally rectangular in plan of nearly the same size as the frame 6 although somewhat smaller in length and width. The platen is substantially parallel to the upper run 17 of the conveyor chain. The platen at its corners is supported on adjusting cams 23. The platen corners preferably have extended angles 24 secured thereto, each of which is effective to rest on a selected flat face 26 of a multi-faced subjacent cam 23. Conveniently, the two cams on one side of the device are both fixed on a longitudinal adjusting rod 27. At one end of the machine the rod has a hand lever 28.

The structure is duplicated at both sides of the device, as shown in FIG. 2.

An attendant, by rotating the rod 27, or rods 27, can cause the platen to move up or down and to rest stationarily on any selected ones of the flat as straight faces of the cams. In this fashion the lower planar face of the heating element is moved toward or away from the subjacent conveyor and toward or away from the exposed faces of any bun heels or crowns resting on the conveyor and being advanced thereby.

Particularly pursuant to the present invention, there is disposed on each of the vertically movable platens 21, as an example, a drawer enclosure 31 or preferably a pair thereof is a generally rectangular box having a top plate 32, an end plate 33, a pair of side plates 34 and a bottom plate 36, but is devoid of any other end plate. The top plate 32, the side plates 34 and the bottom plate 36 preferably extend transversely or in a direction perpendicular to the direction of advance 18. The plates terminate substantially at the edge or side of the frame, affording extending substantially through a drawer opening 37 in the panel 10 at such location.

As shown in FIG. 2, there is substantial vertical clearance between the top and bottom of the drawer enclosures 31 and the openings 37 in the side wall 10 on the frame 6 to allow vertical movement of the drawer enclosures 31.

By disposing a drawer enclosure 31 in this fashion, there is provided a box in effect isolated from the surrounding atmosphere yet disposed upon the heating element 21 or platen in such a fashion that heat which does not flow toward the buns below is able to rise into the interior of the drawer enclosure 31 and to elevate the temperature thereof a substantial amount. This heat would normally be wasted and dissipated to the atmosphere. In the present instance, such heat is conserved and is utilized to maintain the bun temperature at the desired value.

The drawer enclosure 31 is augmented, if desired, by a slidable drawer 38 of the usual construction and having a drawer plate 39 at one end thereof, the plate 39 being inturned so as to abut snugly against the planar side of the frame panel 10 in any vertical location of the drawer plate 39 when the drawer is closed. With this arrangement, the drawer can be slid in and out easily and when closed is substantially airtight against the side of the frame panel so that there is little or no local air circulation and substantially no loss of heat from that region panel 10 in any vertical location of the drawer plate 39 despite the momentary vertical position of the drawer.

The arrangement of the drawer, as illustrated, is the preferred one, and the drawer itself can contain, as shown in the upper portion of FIG. 2, a particular bun tray 41 of the sort shown in our copending application entitled "Staging Cabinet And Tray Combination" filed June 12, 1978 with Ser. No. 914,358. This tray 41 is a sheet metal device having downturned sides 42 and upturned edges 43 as well as central embossments 44 carrying perforations 46. The tray simply rests in the bottom of the drawer and serves as a means for simultaneously inserting or removing a dozen buns or bun portions therefrom.

If desired, the drawer itself need not be utilized, but, as shown in the upper left-hand portion of FIG. 1, a tray itself may be slid directly into and out of the drawer enclosure 31. This is not quite as thermally efficient as having a drawer and having the drawer closed, but is sometimes easier for rapid operation.

Also as shown in the drawings the pair of drawers and drawer enclosures utilized above the upper heating element 21 is augmented by a substantially duplicate construction disposed just above the lower heating element 21. That is, there is a duplicate heating element or platen, there is a duplicate conveyor, and there are duplicate drawer enclosures, each provided with its own sliding drawer if desired.

With this arrangement it is possible to feed in buns and heels to the two conveyors, and when the buns and heels are released from the other end of the machine in toasted condition they can be placed immediately on trays either standing alone or standing in removed drawers, which then can be placed into the drawer enclosures on the frame by a transverse or lateral movement no matter what the momentary vertical position of the platens 21, keeping them in a warm environment until the drawers are opened and the buns, either crowns or heels, are removed for use.

In view of this arrangement, with no additional floor space, with very little additional mechanism, and with substantially no additional heat, energy is conserved by providing the toasted heels and crowns with an appropriate environment for relatively protracted storage and without substantial deterioration in temperature and without substantial drying or other change in moisture content, so that when needed the buns are immediately available in optimum condition for combining with hamburger patties.

We claim:

1. A hamburger bun storage device comprising a frame; a panel partly closing said frame, said panel having a drawer opening therein; a planar, horizontal conveyor on said frame and movable along the bottom of a cooking tunnel in a predetermined direction; a planar heating element on said frame and disposed at the top of said cooking tunnel; means for raising and lowering said heating element between various vertical positions relative to said frame and to said drawer opening; a drawer enclosure resting upon and carried by said heating element and open transversely of said direction and extending substantially through said drawer opening in said various vertical positions of said drawer enclosure; and a drawer slidable in said drawer enclosure in a direction transverse to said predetermined direction, said drawer including an end closure plate in the closed position of said drawer adapted substantially to abut said panel and to overlie said opening in said panel in all vertical positions of said drawer enclosure.

* * * * *